(12) United States Patent
Kim et al.

(10) Patent No.: US 11,293,440 B2
(45) Date of Patent: Apr. 5, 2022

(54) COMPRESSOR

(71) Applicant: LG Electronics Inc., Seoul (KR)

(72) Inventors: Taekyoung Kim, Seoul (KR); Kangwook Lee, Seoul (KR); Cheolhwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 189 days.

(21) Appl. No.: 16/680,912

(22) Filed: Nov. 12, 2019

(65) Prior Publication Data

US 2020/0149547 A1    May 14, 2020

(30) Foreign Application Priority Data

Nov. 12, 2018  (KR) .......................... 10-2018-0138497
Nov. 12, 2018  (KR) .......................... 10-2018-0138499

(51) Int. Cl.
*F04C 29/02*        (2006.01)
*B01D 45/16*        (2006.01)
(Continued)

(52) U.S. Cl.
CPC ............ *F04C 29/026* (2013.01); *B01D 45/16* (2013.01); *F04C 18/0215* (2013.01); *F25B 49/022* (2013.01); *F04D 31/00* (2013.01)

(58) Field of Classification Search
CPC .. F04C 29/026; F04C 18/0215; F04C 23/008; F04C 23/02; F04C 2240/803;
(Continued)

(56) References Cited

U.S. PATENT DOCUMENTS 3,781,138 A * 12/1973 Bellmer ................ F04C 29/045
                                                    417/368
4,717,316 A     1/1988 Muramatsu et al.
2012/0189470 A1* 7/2012 Okaichi ................ F04C 29/023
                                                    417/321

FOREIGN PATENT DOCUMENTS

CN          1124332       6/1996
CN          102022325     4/2011
(Continued)

OTHER PUBLICATIONS

Korean Final Office Action in Korean Application No. 10-2018-0138499, dated Sep. 8, 2020, 8 pages (with English translation).
(Continued)

*Primary Examiner* — Justin D Seabe
*Assistant Examiner* — Eric A Lange
(74) *Attorney, Agent, or Firm* — Fish & Richardson P.C.

(57) ABSTRACT

A compressor includes a case, a driving motor including a stator mounted inside the case and a rotor disposed radially inward of the stator and rotatable, a centrifugation space defined inside the case by one side of the driving motor and the case, a discharge pipe passing through the case and defining a refrigerant inlet hole, a rotation shaft coupled to the rotor to rotate, a compressing portion defined at the other side of the driving motor, where refrigerant is compressed by rotation of the rotation shaft, and a rotating member disposed to spread a rotary power of the rotor to the centrifugation space, thereby providing a centrifugal force to refrigerant and oil. The rotating member is disposed at one side of the rotor to rotate integrally with the rotor.

19 Claims, 9 Drawing Sheets

(51) Int. Cl.
    *F25B 49/02*     (2006.01)
    *F04C 18/02*     (2006.01)
    *F04D 31/00*     (2006.01)

(58) Field of Classification Search
    CPC ........ F04B 53/18; F01C 21/10; F25B 49/022;
                    B01D 45/16; F04D 29/422; F04D 31/00
    See application file for complete search history.

(56) References Cited

FOREIGN PATENT DOCUMENTS

| | | | | |
|---|---|---|---|---|
| CN | 102105692 | | 6/2011 | |
| CN | 102251966 | | 11/2011 | |
| CN | 202732353 | | 2/2013 | |
| CN | 105604949 | | 5/2016 | |
| CN | 105604949 | A * | 5/2016 | |
| CN | 106246547 | | 12/2016 | |
| CN | 107795489 | | 3/2018 | |
| JP | 58170893 | | 10/1983 | |
| JP | S58170893 | A * | 10/1983 | ............ F04C 29/026 |
| JP | S62199992 | | 9/1987 | |
| JP | 2009228668 | | 10/2009 | |
| JP | 2011106348 | | 6/2011 | |
| JP | 2013234666 | | 11/2013 | |
| KR | 1019990030731 | | 5/1999 | |
| KR | 200224364 | | 5/2001 | |
| KR | 200224364 | Y1 * | 5/2001 | ............. F04C 18/02 |
| KR | 1020150099901 | | 9/2015 | |
| KR | 1020160095817 | | 8/2016 | |
| KR | 1020180090677 | | 8/2018 | |

OTHER PUBLICATIONS

Extended European Search Report in European Application No. 19208274.1, dated Feb. 26, 2020, 7 pages.
EP Office Action in European Appln. No. 19208274.1, dated Dec. 9, 2020, 5 pages.
CN Office Action in Chinese Appln. No. 201911100197.5, dated May 6, 2021, 15 pages (with English translation).
Office Action in Chinese Appln. No. 201911100197.5, dated Oct. 25, 2021, 14 pages (with English translation).
Office Action in European Appln. No. 19208274.1, dated Oct. 22, 2021, 6 pages.

* cited by examiner

FLOW INTO CUP-PIPE DISCHARGE PATH AT 80 DEGREES

| Case | CONDITION | OCR [wt%] |
|---|---|---|
| BASIC CONCEPT | 120 Hz | 0.02 |
| Case 1 | 161 Hz | 0.01 |
| Case 2 | 120 Hz | 0.11 |
| Case 3 | 120 Hz | 0.15 |

| Terminal position | Top cap shape | Operation condition | OCR [wt%] |
|---|---|---|---|
| Upper terminal | Rotary | 120Hz | 0.28 |
| Side terminal | Rotary | 120Hz | 0.13 |
| | Flat | 120Hz | 0.02 |
| | Scroll | 120Hz | 0.02 |

COMPRESSOR

CROSS-REFERENCE TO RELATED APPLICATIONS

This application claims the benefit of Korean Patent Application Nos. 10-2018-0138497, filed on Nov. 12, 2018 and 10-2018-0138499, filed on Nov. 12, 2018, which are hereby incorporated by reference as if fully set forth herein.

BACKGROUND

Field

The present disclosure relates to a compressor, and more particularly, relates to a compressor that may effectively separate lubricant oil and compressed refrigerant from each other within the compressor.

Discussion of the Related Art

In general, a compressor is applied to a refrigerant compression-type refrigeration cycle (hereinafter, referred to as a refrigeration cycle) such as a refrigerator or an air conditioner.

The compressor may be classified into a reciprocating compressor and a rotary-type compressor based on a scheme of compressing the refrigerant, and the rotary-type compressor may include a scroll-type compressor.

The scroll compressor may be classified into an upper compression type and a lower compression type based on positions of a driving motor and a compressing portion. The upper compression type is a scheme in which the compressing portion is located above the driving motor, and the lower compression type is a scheme in which the compressing portion is located below the driving motor.

That is, the compressor may be named differently based on the relative positions of the driving motor and the compressing portion. The compressor may be mounted horizontally rather than vertically. Therefore, the compressor may be named more generally based on the relative positions of the driving motor and the compressing portion. Based on a flow direction of the refrigerant in the compressor and the position of the driving motor, a compressor in which the refrigerant is compressed at upstream of the driving motor and the refrigerant is discharged from downstream of the driving motor may be referred to as an upstream compressor. Further, a compressor in which the refrigerant is compressed at and the refrigerant is discharged from the downstream of the driving motor may be referred to as a downstream compressor.

In the case of the upper compression type compressor (downstream compressor), there's a strong possibility that after the refrigerant is compressed and discharged from the compressing portion located above the driving motor, lubricant oil may be discharged together with the refrigerant. That is, the lubricant oil is mixed with the refrigerant discharged. The lubricant oil mixed with the refrigerant reduces a cooling efficiency and causes a lack of the lubricant oil inside the compressor. Therefore, in the case of the upper compression type compressor, it is common to periodically need to recover the lubricant oil or to install a separate oil recovery apparatus or an oil separator.

Rotational flow may be generated in the discharge space by a rotor and a rotation shaft of the driving motor. That is, the discharge space may be referred to as a centrifugation space. The rotational flow is generated around a center portion of the discharge space, that is, a center portion of the centrifugation space. Thus, centrifugation of the refrigerant and the lubricant oil may occur by such rotational flow.

A density of the lubricant oil is significantly higher than that of the refrigerant. Therefore, the lubricant oil may be gathered to an outer portion of the discharge space, the refrigerant may be gathered to a center of the discharge space by the centrifugation, and then may be discharged out of the compressor.

Thus, the lower compression type compressor may be said to have an oil content rate significantly less than that of the upper compression type compressor. However, the oil content rate from the lower compression type compressor is not negligible, so that it is common to install the separate oil recovery apparatus or oil separator. Therefore, it is necessary to find a way to significantly reduce the oil content rate, so that the separate oil recovery apparatus or oil separator may be omitted in the lower compression type compressor.

SUMMARY

The present embodiment aims to provide a compressor that may significantly reduce an oil content rate.

The present embodiment aims to provide a compressor that may effectively use a discharge space of refrigerant as a centrifugation space. In particular, the present embodiment aims to provide a compressor that may use a substantially entirety, which is not a portion, of the discharge space of the refrigerant, as the centrifugation space.

The present embodiment aims to provide a compressor that may significantly reduce an oil content rate even with very small changes in the existing compressor configuration.

The present embodiment aims to provide a compressor that may significantly reduce an oil content rate by effectively removing factors that obstruct flow resulted from centrifugation in a centrifugation space.

The present embodiment aims to provide a compressor that may significantly reduce an oil content rate by reducing a flow resistance based on a shape of a first shell.

The present embodiment aims to provide a compressor that may significantly reduce an oil content rate by disposing a terminal, which is disposed on a first shell, on a cylindrical shell, which is a side of a case.

The present embodiment aims to provide a compressor that may satisfy an oil content rate of less than 0.01 weight percent, which is significantly lower than a required oil content rate of 0.1 weight percent, by expanding a centrifugation space and removing resistive factors of centrifugal flow at the same time.

One aspect of the present disclosure proposes a compressor including a case, a driving motor including a stator mounted inside the case and a rotor disposed radially inward of the stator and rotatable, a centrifugation space defined inside the case by one side (downstream side) of the driving motor and the case, wherein centrifugation of compressed refrigerant and lubricant oil is performed in the centrifugation space, a discharge pipe passing through the case and having a distal end defining a refrigerant inlet hole extending into the centrifugation space, a rotation shaft coupled to the rotor to rotate, a compressing portion defined at the other side (upstream side) of the driving motor, wherein the refrigerant is compressed by rotation of the rotation shaft, and a rotating member disposed to spread a rotary power of the rotor to the centrifugation space, thereby providing a centrifugal force to the refrigerant and the oil, wherein the rotating member is disposed at one side (downstream side) of the rotor to rotate integrally with the rotor. The rotating member can rotate in the centrifugation space providing a centrifugal force to the refrigerant and the oil.

In one implementation, the rotating member may include a rotary wing positioned in the centrifugation space and spaced apart from a center of the rotor by a predetermined distance. The rotary wing may be disposed to have a predetermined radius from a center of the rotor.

In one implementation, a maximum outer diameter of the rotary wing may be equal to or less than an outer diameter of the rotor. Further, the maximum outer diameter of the rotary wing may be equal to or larger than the outer diameter of the rotor.

In one implementation, the rotary wing may be a single rotary wing having a circular cross-section or a single rotary wing having a polygonal cross-section.

In one implementation, a minimum inner diameter of the rotary wing may be preferably larger than an outer diameter of the discharge pipe to surround the discharge pipe.

In one implementation, the rotary wing may be disposed to have a predetermined vertical level from the rotor to define an internal space of the rotating member in the centrifugation space.

In one implementation, the rotary wing may be formed to have a constant height, or have a height varying in a circumferential direction, but formed to be symmetric in the circumferential direction.

In one implementation, a distal end of the discharge pipe may further extend into the internal space of the rotating member.

In one implementation, a shortest linear distance T between the refrigerant inlet hole of the discharge pipe and a bottom of the rotating member defining the internal space of the rotating member may be larger than $\frac{1}{10}$ of a linear distance h1 between a top of the rotary wing and an inner top face of the case.

In one implementation, a height of the rotary wing may be equal to or greater than a height of an end coil wound around the stator.

In one implementation, the rotating member may include a flange portion coupled to the rotor, and wherein the rotary wing may protrude to have a height from the flange portion.

In one implementation, the flange portion may prevent the refrigerant and the oil flowing into the centrifugation space through a gap from directly entering the internal space of the rotating member. That is, it is preferable that the refrigerant bypasses radially outward of the rotary wing of the rotating member, so that the refrigerant flows into the internal space of the rotating member.

In one implementation, when a gap between a bottom of the rotary wing and a top of the rotor is narrow, a maximum outer diameter of the rotary wing may be preferably equal to or smaller than the outer diameter of the rotor. In this case, the refrigerant and the oil flowing into the centrifugation space through the gap are gathered to a radially outer side under an influence of the rotary wing and not under an influence of the flange portion.

In one implementation, on the other hand, when the gap between the bottom of the rotary wing and the top of the rotor is large, the maximum outer diameter of the rotary wing may be preferably equal to or larger than the outer diameter of the rotor. In this case, the refrigerant and the oil flowing into the centrifugation space through the gap are gathered to the radially outer side under the influences of the flange portion and the rotary wing. Since a separation distance between the flange portion and the gap is sufficient, a time of receiving the centrifugal force may be increased.

In one implementation, the flange portion and the rotary wing may be integrally formed.

In one implementation, the compressor may further include a guide disposed near a distal end of the discharge pipe to surround the discharge pipe, wherein the guide may prevent the lubricant oil from flowing into the refrigerant inlet hole of the discharge pipe from near an outer face of the discharge pipe.

In one implementation, the guide may have a skirt shape extending radially from the outer face of the discharge pipe.

In one implementation, a vertical level of a top of the guide may be the same as or higher than a vertical level of a top of the rotary wing.

In one implementation, the guide may have a circular plate shape having a center portion penetrated by the discharge pipe.

In one implementation, a maximum outer diameter of the guide may be smaller than a minimum inner diameter of the rotary wing.

In one implementation, the guide may be disposed in an internal space of the rotating member defined by a rotary wing, and wherein a distal end of the discharge pipe may preferably further extend into the internal space of the rotating member.

In one implementation, a shortest linear distance T between the refrigerant inlet hole of the discharge pipe and a bottom of the rotating member defining the internal space of the rotating member may be larger than $\frac{1}{10}$ of a linear distance h1 between a top of the rotary wing and an inner top face of the case.

In one implementation, the rotating member may include a flange portion in a form of a plate and a coupling portion fixing the flange portion to the rotor or to the rotation shaft such that a center of the flange portion and a center of the rotor or of the rotation shaft coincide, and separating the flange portion away from the rotor toward the centrifugation space.

In one implementation, the compressor may further include a terminal disposed on a side of the case that is a side of the centrifugation space, wherein the terminal may be connected to a coil of the stator. Thus, abnormal flow in the centrifugation space may be prevented to enhance the centrifugation effect.

The present embodiment may provide the compressor that may effectively use the discharge space of the refrigerant as the centrifugation space. In particular, the present embodiment may provide the compressor that may use the substantially entirety, which is not the portion, of the discharge space of the refrigerant, as the centrifugation space.

The present embodiment may provide the compressor that may significantly reduce the oil content rate even with the very small changes in the existing compressor configuration.

The present embodiment may provide the compressor that may significantly reduce the oil content rate by effectively removing the factors that obstruct the flow resulted from the centrifugation in the centrifugation space.

The present embodiment may provide the compressor that may significantly reduce the oil content rate by reducing the flow resistance based on the shape of the first shell.

The present embodiment may provide the compressor that may significantly reduce the oil content rate by disposing the terminal, which is disposed on the first shell, on the cylindrical shell, which is the side of a case.

The present embodiment may provide the compressor that may satisfy the oil content rate of less than 0.01 weight percent, which is significantly lower than the required oil content rate of 0.1 weight percent, by expanding the centrifugation space and removing the resistive factors of the centrifugal flow at the same time.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2 to 7 are views of embodiments of a first type for OCR reduction;

FIGS. 8 to 13 are diagrams of embodiments of a second type for OCR reduction.

DESCRIPTION OF SPECIFIC EMBODIMENTS

Figure 1:
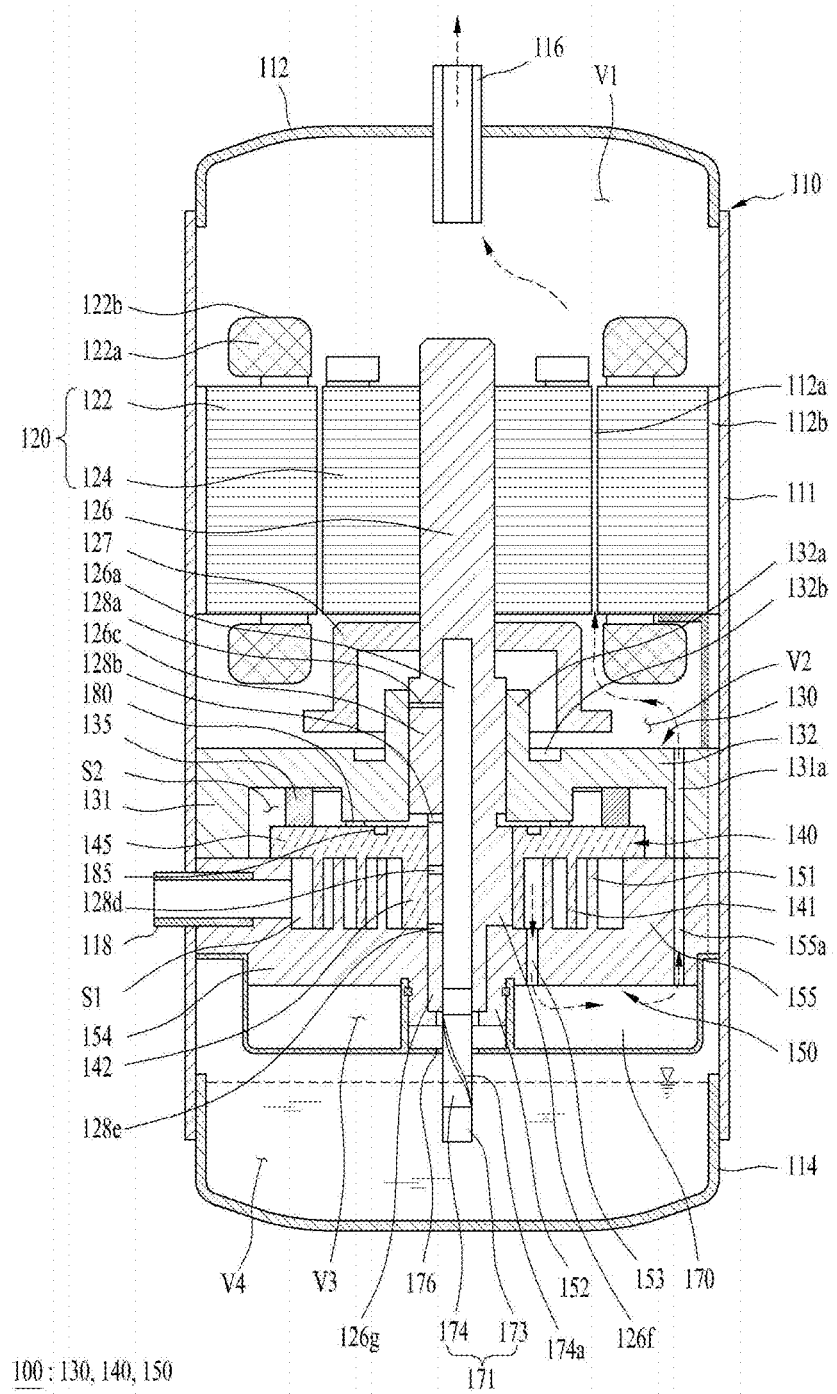
FIG. 1 illustrates a cross-section of a compressor, in particular, of a lower (upstream) compression type scroll compressor that may be applied to the present disclosure.

Hereinafter, preferred embodiments of the present disclosure will be described in detail with reference to the accompanying drawings. In the drawings, the same reference numerals are used to indicate the same or similar components.

First, a compressor that may be applied to one embodiment of the present disclosure will be described in detail with reference to FIG. 1.

FIG. 1 illustrates a cross-section of a scroll compressor that may be applied to one embodiment of the present disclosure. Since a compressing portion is located below a driving motor, the scroll motor may be referred to as a lower compression type compressor or an upstream compressor.

For convenience of description, upper/lower position may be named based on the compressor, which is vertically located. Further, upstream/downstream position may be named based on flow of refrigerant and a position of the driving motor 120. In the same compressor, "upper" means downstream, and "lower" means upstream.

The compressor according to the present disclosure may include a case 110, the driving motor 120, a compressing portion 100, and a rotation shaft 126.

The case 110 may be formed to have an internal space defined therein. For example, an oil storage space for storing oil therein may be defined at a lower portion of the case 110. The oil storage space may mean a fourth space V4 to be described later. That is, the fourth space V4 to be described later may be defined as the oil storage space.

In addition, a refrigerant discharge pipe 116 for discharging compressed refrigerant may be disposed at a top.

Specifically, the internal space of the case 110 may include a first space V1 defined above the driving motor 120, a second space V2 defined between the driving motor 120 and the compressing portion 100, a third space V3 defined by a discharge cover 170 to be described later, and the fourth space V4 defined below the compressing portion 100.

The case 110 may be formed in a cylindrical shape. For example, the case 110 may include a cylindrical shell 111 having open top and bottom.

A first shell 112 may be installed at the top of the cylindrical shell 111, and a second shell 114 may be installed at the bottom of the cylindrical shell 111. The first and second shells 112 and 114 may be coupled to the cylindrical shell 111 by welding, for example, to define the internal space.

FIG. 1 is a general configuration, which does not illustrate an oil separator or an oil recovery apparatus connected to the compressor. This means that the oil may be efficiently separated in the compressor according to the present embodiment enough that no separate oil separator is required.

The first shell or the second shell 114 may define the fourth space V4 which is the oil storage space capable of storing the oil therein. The fourth space V4 may function as an oil chamber for supplying the oil to the compressing portion 100 such that the compressor may operate smoothly.

In addition, a refrigerant suction pipe 118, which is a passage through which the refrigerant to be compressed is introduced, may be installed at a side of the cylindrical shell 111. The refrigerant suction pipe 118 may be installed to pass through a compression chamber S1 along a side of a fixed scroll 150 to be described later.

The driving motor 120 may be installed inside the case 110. For example, the driving motor 120 may be disposed above the compressing portion 100 inside the case 110.

The driving motor 120 may include a stator 122 and a rotor 124. The stator 122 may be cylindrical, for example, and may be fixed to the case 110. A coil 122a may be wound around the stator 122. In addition, a refrigerant flow path groove 112a may be defined between an outer circumferential face of the rotor 124 and an inner circumferential face of the stator 122 such that the refrigerant or the oil discharged from the compressing portion 100 may pass therethrough. That is, the refrigerant flow path groove 112a may be defined by the inner circumferential face of the stator 122 and the outer circumferential face of the rotor 124.

The rotor 124 may be disposed radially inward of the stator 122 and may generate rotatory power. That is, the rotation shaft 126 is injected in a center portion of the rotor 124, so that the rotor 124 may rotate with the rotation shaft 126. The rotatory power generated by the rotor 124 may be transmitted to the compressing portion 100 through the rotation shaft 126.

The compressing portion 100 may be coupled to the driving motor 120 to compress the refrigerant. The compressing portion 100 may be formed to be penetrated by the rotation shaft 126 connected to the driving motor 120.

The compressing portion 100 may include a shaft receiving portion protruding in an axial direction or in upward and downward directions. The rotation shaft 126 may penetrate at least a portion of the shaft receiving portion. For example, the shaft receiving portion may include a first shaft receiving portion and a second shaft receiving portion respectively protruding upward and downward from the compressing portion 100, and a detailed description thereof will be described later.

The compressing portion 110 may include a main frame 130, the fixed scroll 150, and an orbiting scroll 140.

Specifically, the compressing portion 100 may further include an oldham's ring 135. The oldham's ring 135 may be installed between the orbiting scroll 140 and the main frame 130. Further, the oldham's ring 135 allows an orbiting movement of the orbiting scroll 140 on the fixed scroll 150 while preventing the orbiting scroll 140 from revolving.

The main frame 130 may be spaced apart from the driving motor 120 in a direction opposite to a moving direction of the refrigerant. The main frame 130 may be disposed below the driving motor 120, and may form an upper portion of the compressing portion 100.

The main frame 130 may include a frame end plate (hereinafter, referred to as a 'first end plate') 132 having a substantially circular shape, a frame shaft receiving portion (hereinafter referred to as a 'first shaft receiving portion') 132a disposed in a center portion of the first end plate 132 and through which the rotation shaft 126 passes, and a frame sidewall (hereinafter referred to as a 'first sidewall') 131 protruding from an outer circumferential portion of the first end plate 132. For example, the first sidewall 131 may extend downward from the first end plate 132. An outer circumferential portion of the first sidewall 131 may be in contact with an inner circumferential face of the cylindrical shell 111, and one end of a lower end of the first sidewall 131 may be in contact with an upper end of a fixed scroll sidewall 155 to be described later.

A frame discharge hole 131a that penetrates the first sidewall 131 in the axial direction to define a refrigerant passage may be defined in the first sidewall 131. An entrance of the frame discharge hole 131a may be in communication with an exit of a fixed scroll discharge hole 155a to be described later, and an exit of the frame discharge hole 141a may be in communication with the second space V2. The frame discharge hole 131a and the fixed scroll discharge hole 155a in communication with each other may be represented as second discharge holes 131a and 155a.

The frame discharge hole 131a may include a plurality of frame discharge holes along a circumference of the main frame 130.

In addition, the fixed scroll discharge hole 155a also may include a plurality of fixed scroll discharge holes along a circumference of the fixed scroll 150 to respectively correspond to the plurality of frame discharge hole 131a.

The first shaft receiving portion 132a may protrude from one face or an upper face of the first end plate 132 toward the driving motor 120. In addition, a first bearing portion may be formed in the first shaft receiving portion 132a such that a main bearing portion 126c of the rotation shaft 126 to be described later is penetrated and supported.

That is, the first shaft receiving portion 132a in which the main bearing portion 126c of the rotation shaft 126 constituting the first bearing portion is rotatably inserted and supported may penetrate a center portion of the main frame 130 in the axial direction.

An oil pocket 132b for collecting the oil discharged between the first shaft receiving portion 132a and the rotation shaft 126 may be defined in an upper face of the first end plate 132.

The oil pocket 132b may be recessed from the one face or upper face of the first end plate 132, and may be formed in an annular shape along a circumference of the first shaft receiving portion 132a. In addition, a back pressure chamber S2 is defined in the other face or an inner face of the main frame 130 to define a space together with the fixed scroll 150 and the orbiting scroll 140 to support the orbiting scroll 140 by a pressure of such space.

For reference, the back pressure chamber S2 may include an intermediate pressure region (i.e., an intermediate pressure chamber), and an oil supply passage 126a defined in the rotation shaft 126 may include a high pressure region having a pressure higher than that of the back pressure chamber S2.

A back pressure seal 180 may be disposed between the main frame 130 and the orbiting scroll 140 to distinguish such high pressure region and intermediate pressure region. The back pressure seal 180 may serve as a sealing member, for example.

In addition, the main frame 130 may be coupled with the fixed scroll 150 to define a space in which the orbiting scroll 140 may be orbitably installed.

The fixed scroll 150 may be disposed on one side of the main frame 130. The fixed scroll 150 may be disposed below the main frame 130. That is, the fixed scroll 150 constituting a first scroll may be coupled to the other face or inner face of the main frame 130.

The fixed scroll 150 may include a fixed scroll end plate (hereinafter, referred to as a 'second end plate') 154 having a substantially circular shape, a fixed scroll sidewall (hereinafter referred to as a 'second shaft receiving portion') 155 protruding from an outer circumference of the second end plate 154, a fixed wrap 151 protruding from the second end plate 154 and engaging with an orbiting wrap 141 of the orbiting scroll 140 to be described later to form the compression chamber S1, and a fixed scroll shaft receiving portion (hereinafter, referred to as a 'second shaft receiving portion') 152 formed at a center portion of a rear face of the second end plate 154 and through which the rotation shaft 126 passes.

The compressing portion 100 may include a first discharge hole 153 for discharging the compressed refrigerant to the discharge cover 170 and the above-described second discharge holes 131a and 155a for guiding the refrigerant, spaced apart from the first discharge hole 153 in a radially outward direction of the compressing portion 100 and compressed, to the refrigerant discharge pipe 116.

Specifically, the first discharge hole 153 for guiding the compressed refrigerant from the compression chamber S1 to the internal space of the discharge cover 170 may be defined in the second end plate 154. In addition, a position of the first discharge hole 153 may be arbitrarily set in consideration of a required discharge pressure.

As the first discharge hole 153 is defined toward the second shell 114, the discharge cover 170 for guiding the refrigerant discharged from the compressing portion to the fixed scroll discharge hole 155a to be described later may be coupled to one face of the fixed scroll 150.

The discharge cover 170 may be sealingly coupled to an exposed face or a bottom of the compressing portion 100. The discharge cover 170 may be formed to guide the refrigerant compressed in the compressing portion 100 toward the refrigerant discharge pipe 116.

For example, the discharge cover 170 may be sealingly coupled to an exposed face of the fixed scroll 150 to separate a discharge passage of the refrigerant and the fourth space V4.

In addition, a through hole 176 may be defined in the discharge cover 170 such that an oil feeder 171 coupled to an auxiliary bearing portion 126g of the rotation shaft 126, which constitutes a second bearing portion, and at least partially submerged in the oil contained in the fourth space V4 passes through the through hole 176.

Further, the second sidewall 155 may have the fixed scroll discharge hole 155a defined therein, which penetrates the second sidewall 155 in the axial direction to define a refrigerant passage together with the frame discharge hole 131a.

The fixed scroll discharge hole 155a may be defined to correspond to the frame discharge hole 131a, an entrance of the fixed scroll discharge hole 155a may be in communication with the internal space of the discharge cover 170, and the exit thereof may be in communication with the entrance of the frame discharge hole 131a.

The fixed scroll discharge hole 155a and the frame discharge hole 131a may communicate the third space V3 and the second space V2 with each other such that the refrigerant discharged from the compression chamber S1 to the internal space of the discharge cover 170 is guided to the second space V2.

In addition, the refrigerant suction pipe 118 may be installed on the second sidewall 155 so as to be in communication with a suction side of the compression chamber S1. In addition, the refrigerant suction pipe 118 may be installed to be spaced apart from the fixed scroll discharge hole 155a.

The second shaft receiving portion 152 may protrude from an exposed face or a lower face of the second end plate 154 toward the fourth space V4. In addition, the second bearing portion may be provided in the second shaft receiving portion 152 such that the auxiliary bearing portion 126g of the rotation shaft 126 is inserted therein and supported.

In addition, the second shaft receiving portion 152 may be bent toward an axis center such that a distal end or a lower end thereof supports a lower end of the auxiliary bearing portion 126g of the rotation shaft 126 to form a thrust bearing face.

The orbiting scroll 140 may be disposed between the main frame 130 and the fixed scroll 150 and form a second scroll.

Specifically, the orbiting scroll 140 may be coupled to the rotation shaft 126 to form two (a pair of) compression chambers S1 between the orbiting scroll 140 and the fixed scroll 150 while orbiting.

The orbiting scroll 140 may include an orbiting scroll end plate (hereinafter, referred to as a 'third end plate') 145 having a substantially circular shape, the orbiting wrap 141 protruding from a lower face of the third end plate 145 and engaging with the fixed wrap 151, and a rotation shaft coupling portion 142 formed at a center portion of the third end plate 145 and rotatably coupled to an eccentric portion 126f of the rotation shaft 126.

An outer circumferential portion of the third end plate 145 may be located on one end or an upper end of the second sidewall 155, and the other end or a lower end of the orbiting wrap 141 may be in close contact with one face or an upper face of the second end plate 154 and may be supported by the fixed scroll 150.

For reference, a pocket groove 185 may be defined in an upper face of the orbiting scroll 140 to guide the oil discharged through oil holes 128a, 128b, 128d, and 128e to be described later toward the intermediate pressure chamber.

In detail, the pocket groove 185 may be recessed from one face or an upper face of the third end plate 145. That is, the pocket groove 185 may be defined one face or the upper face of the third end plate 145 between the back pressure seal 180 and the rotation shaft 126.

In addition, at least one pocket groove 185 may be defined at both sides of the rotation shaft 126, as shown in the drawing. The pocket groove 185 may be defined in an annular shape around the rotation shaft 126 in one face or the upper face of the third end plate 145, between the back pressure seal 180 and the rotation shaft 126.

An outer circumferential portion of the rotation shaft coupling portion 142 may be connected to the orbiting wrap 141 to define the compression chamber S1 together with the fixed wrap 151 during the compression process.

The fixed wrap 151 and the orbiting wrap 141 may be formed in an involute shape. The involute shape may mean a curve that corresponds to a trajectory that, when unwinding a yarn wound around a base circle having an arbitrary radius, an end of a yarn draws.

In addition, the eccentric portion 126f of the rotation shaft 126 may be inserted into the rotation shaft coupling portion 142. The eccentric portion 126f inserted in the rotation shaft coupling portion 142 may overlap the orbiting wrap 141 or fixed wrap 151 in a radial direction of the compressor.

In this connection, the radial direction may mean a direction (i.e., left and right direction) orthogonal to the axial direction (i.e., up and down direction).

As described above, when the eccentric portion 126f of the rotation shaft 126 passes through the third end plate 154 and overlaps the orbiting wrap 141 in the radial direction, a repulsive force and a compressive force of the refrigerant may be applied to the same plane based on the third end plate 145 and partially offset.

In addition, the rotation shaft 126 may be coupled to the driving motor 120, and may have the oil supply passage 126a defined therein for guiding the oil contained in the fourth space V4, which is the oil storage space of the case 110, upward.

In detail, one end or an upper portion of the rotation shaft 126 may be pressed and coupled into a center portion of the rotor 124, and the other end or a lower end thereof may be coupled to the compressing portion 100 and radially supported.

The rotation shaft 126 may transmit the rotatory power of the driving motor 120 to the orbiting scroll 140 of the compressing portion 100. Thus, the orbiting scroll 140 eccentrically coupled to the rotation shaft 126 may orbit about the fixed scroll 150.

The main bearing portion 126c may be formed at the other end or lower portion of such rotation shaft 126 so as to be inserted into the first shaft receiving portion 132a of the main frame 130 and radially supported. In addition, the auxiliary bearing portion 126g may be formed at the other end or lower portion of the main bearing portion 126c so as to be inserted into the second shaft receiving portion 152 of the fixed scroll 150 and radially supported. Further, the eccentric portion 126f may be formed between the main bearing portion 126c and the auxiliary bearing portion 126g so as to be inserted into and coupled to the rotation shaft coupling portion 142 of the orbiting scroll 140.

The main bearing portion 126c and the auxiliary bearing portion 126g may be formed coaxially to have the same axial center, and the eccentric portion 126f may be formed radially eccentric with respect to the main bearing portion 126c or the auxiliary bearing portion 126g.

An outer diameter of the eccentric portion 126f may be smaller than that of the main bearing portion 126c, and larger than that of the auxiliary bearing portion 126g. In this case, it may be advantageous for the rotation shaft 126 to pass through and to be coupled to each of the shaft receiving portions 132a and 152 and the rotation shaft coupling portion 142.

Further, the oil supply passage 126a for supplying the oil in the fourth space V4, which is the oil storage space, to an outer circumferential face of each of the bearing portions 126c and 126g and to an outer circumferential face of the eccentric portion 126f may be defined inside the rotation shaft 126. The oil holes 128a, 128b, 128d, and 128e penetrated in a radially outward direction of the rotation shaft 126 from the oil supply passage 126a may be defined in the bearing portion of the rotation shaft 126 and the eccentric portions 126c, 126g, and 126f.

Specifically, the oil holes may include a first oil hole 128a, a second oil hole 128b, a third oil hole 128d, and a fourth oil hole 128e.

First, the first oil hole 128a may be defined to penetrate an outer circumferential face of the main bearing portion 126c. The first oil hole 128a may be defined to penetrate into the outer circumferential face of the main bearing portion 126c from the oil supply passage 126a.

In addition, the first oil hole 128a may be defined to, for example, penetrate one end or an upper portion of the outer circumferential face of the main bearing portion 126c, but is not limited thereto. When the first oil hole 128a includes a plurality of holes, the plurality of holes may be defined only at one end/upper portion or the other end/lower portion of the outer circumferential face of the main bearing portion 126c, or may be defined at one end/upper portion and the other end/lower portion of the outer circumferential face of the main bearing portion 126c.

The second oil hole 128b may be defined between the main bearing portion 126c and the eccentric portion 126f. Unlike as illustrated in the drawing, the second oil hole 128b may include a plurality of holes.

The third oil hole 128d may be defined to penetrate the outer circumferential face of the eccentric portion 126f. Specifically, the third oil hole 128d may be defined to penetrate into the outer circumferential face of the eccentric portion 126f from the oil supply passage 126a.

The fourth oil hole 128e may be defined between the eccentric portion 126f and the auxiliary bearing portion 126g.

The oil guided through the oil supply passage 126a may be discharged through the first oil hole 128a and supplied to an entirety of the outer circumferential face of the main bearing portion 126c.

In addition, the oil guided through the oil supply passage 126a may be discharged through the second oil hole 128b to be supplied to one face or an upper face of the orbiting scroll 140, and then discharged through the third oil hole 128d to be supplied to the entirety of the outer circumferential face of the eccentric portion 126f.

In addition, the oil guided through the oil supply passage 126a may be discharged through the fourth oil hole 128e to be supplied to an outer circumferential face of the auxiliary bearing portion 126g or between the orbiting scroll 140 and the fixed scroll 150.

The oil feeder 171 for pumping the oil filled in the fourth space V4 may be coupled to the lower end of the rotation shaft 126, that is, the other end or lower end of the auxiliary bearing portion 126g. The oil feeder 171 may be formed to supply the oil contained in the fourth space V4 toward the aforementioned oil holes 128a, 128b, 128d, and 128e.

The oil feeder 171 may include an oil supply pipe 173 inserted into and coupled to the oil supply passage 126a of the rotation shaft 126 and an oil suction member 174 inserted into the oil supply pipe 173 to suck the oil.

The oil supply pipe 173 may be installed to pass through the through hole 176 of the discharge cover 170 and be submerged in the fourth space V4, and the oil suction member 174 may function as a propeller.

The oil suction member 174 may have a spiral groove 174a defined therein extending along a longitudinal direction of the oil suction member 174. The spiral groove 174a may be defined around the oil suction member 174, and may extend toward the oil holes 128a, 128b, 128d, and 128e described above.

When the oil feeder 171 is rotated together with rotation shaft 126, the oil contained in the fourth space V4 may be guided to the oil holes 128a, 128b, 128d, and 128e along the spiral groove 174a.

A balance weight 127 may be coupled to the rotor 124 or the rotation shaft 126 to suppress noise oscillation. The balance weight 127 may be disposed in the second space V2 between the driving motor 120 and the compressing portion 100.

Next, operations of the scroll compressor according to the present disclosure are as follows.

When the power is supplied to the driving motor 120 to generate the rotary power, the rotation shaft 126 coupled to the rotor 124 of the driving motor 120 is rotated. Then, the orbiting scroll 140 eccentrically coupled to the rotation shaft 126 orbits with respect to the fixed scroll 150 to define the compression chamber S1 between the orbiting wrap 141 and the fixed wrap 151. The compression chamber S1 may be defined in successive steps as a volume thereof gradually narrows centerward.

Then, the refrigerant supplied through the refrigerant suction pipe 118 from the outside of the case 110 may be introduced directly into the compression chamber S1. Such refrigerant may be compressed while moving toward a discharge chamber of the compression chamber S1 by the orbiting movement of the orbiting scroll 140, and then discharged from the discharge chamber to the third space V3 through the discharge hole 153 of the fixed scroll 150.

Thereafter, the compressed refrigerant discharged into the third space V3 repeats a series of processes of being discharged into the internal space of the case 110 through the fixed scroll discharge hole 155a and the frame discharge hole 131a and then being discharged to the outside of the case 110 through the refrigerant discharge pipe 116.

While the compressor is operated, the oil contained in the fourth space V4 may be guided upwardly through the rotation shaft 126 and smoothly supplied to the bearing portion, that is, a bearing face, through the plurality of oil holes 128a, 128b, 128d, and 128e, thereby preventing abrasion of the bearing portion.

In addition, the oil discharged through the plurality of oil holes 128a, 128b, 128d, and 128e may form an oil film between the fixed scroll 150 and the orbiting scroll 140 to maintain an airtight state of the compressing portion.

Due to such oil, the oil may be mixed in the refrigerant compressed in the compressing portion 100 and discharged into the first discharge hole 153. Hereinafter, for convenience of description, the refrigerant in which the oil is mixed may be referred to as oil-mixed refrigerant.

Such oil-mixed refrigerant is guided to the first space V1 via the second discharge holes 131a and 155a, the second space V2, and the refrigerant flow path groove 112a. In addition, the refrigerant in the oil-mixed refrigerant guided to the first space V1 may be discharged to the outside of the compressor through the refrigerant discharge pipe 116, and the oil may be recovered to the fourth space V4 through an oil recovery passage 112b.

For example, the oil recovery passage 112b may be disposed radially outermost in the case 110. Specifically, the oil recovery passage 112b may include a flow path between an outer circumferential face of the stator 122 and the inner circumferential face of the cylindrical shell 111, a flow path between an outer circumferential face of the main frame 130 and the inner circumferential face of the cylindrical shell 111, and a flow path between an outer circumferential face of the fixed scroll 150 and the inner circumferential face of the cylindrical shell 111.

Further, since the discharge cover 170 is coupled to the other end or lower end of the compressing portion 100, a fine gap may exist between the other end or lower end of the compressing portion 100 and an upper end of the discharge cover 170. Such fine gap may cause refrigerant leakage.

That is, when the refrigerant is discharged to the third space V3 through the first discharge hole 153 of the compressing portion 100 and guided to the second discharge holes 131a and 155a, a portion of the refrigerant may leak through the gap that may exist between the compressing portion 100 and the discharge cover 170.

In addition, such leakage of the refrigerant may reduce a compression efficiency of the compressor. Such problem may be solved by sealing members 210 and 220 provided between the compressing portion 100 and the discharge cover 170 (that is, a coupling portion of the compressing portion 100 and the discharge cover 170) and a coupling structure of the compressing portion 100 and the discharge cover 170.

The present embodiment may provide a compressor further including a rotating member 200 in the compressor shown in FIG. 1. That is, the compressor having the rotating member 200 therein for more effectively generating centrifugation in the first space V1 may be provided. Therefore, the first space V1 may be referred to as a centrifugation space where the refrigerant and the oil are centrifuged by the rotating member 200.

An example of the compressor having the rotating member 200 therein will be described in detail with reference to FIG. 2.

A centrifugation space V1 is defined at an upper portion or a downstream of the compressor. Specifically, a centrifugation space defined by the upper portion or downstream of inside the case 110 and one side of the driving motor is defined. The refrigerant compressed in the compressing portion and lubricant oil flow into the centrifugation space.

The discharge pipe 116 having a refrigerant inlet hole 116b defined at a distal end 116a thereof passes through the case 110, in particular, the first shell 112, and extends into the centrifugation space. The compressed refrigerant is discharged to the outside of the compressor through the refrigerant inlet hole 116b.

The stator 122 of the driving motor 120 is fixed to an inner wall of the case 110, in particular, of the cylindrical shell 111, and the rotor 124 is rotatably disposed radially inward of the stator 122. The rotation shaft 126 is disposed at a center portion of the rotor 124. The rotor 124 and the rotation shaft 126 rotate integrally.

Since one end-face or upper end-face of the rotor 124 and rotation shaft 126 defines the centrifugation space V1, centrifugal force is generated by the rotation of the rotor 124 and the rotation shaft 126 at the other end-face or a center of a lower region of the centrifugation space. However, such centrifugal force is difficult to spread throughout the centrifugation space. That is, the centrifugal force is difficult to spread to the first shell 112.

For this reason, the rotating member 200 may be disposed to increase generation of the centrifugal force in the centrifugation space while spreading the centrifugal force to the entirety of the centrifugation space.

The rotating member 200 may be disposed to be fixed above (downstream) of the rotor 124 and/or the rotation shaft 126, and may be disposed to rotate integrally with the rotor 124 and the rotation shaft 126. The rotating member 200 may extend above (downstream) of the rotor 124 and/or the rotation shaft 126. That is, the rotating member 200 may be disposed to spread the rotatory power of the rotor to the centrifugation space, thereby providing the centrifugal force to the refrigerant and the oil.

The rotating member 200 may include a rotary wing 210 positioned in the centrifugation space, spaced apart from a center of the rotor 124, and having a predetermined radius.

The rotary wing 210 has a predetermined height. Therefore, as the rotary wing 21 rotates, an inner space V12 of the rotating member is defined by the radius of the rotary wing 210 and the height of the rotary wing 210. That is, the centrifugation space V1 may be divided into an outer space V11 of the rotating member and the inner space V12 of the rotating member.

The rotary wing 210 is preferably disposed to have a predetermined vertical level from the rotor. The refrigerant and the oil flow into the centrifugation space V1 through a gap between the rotor 124 and the stator 122, that is, the refrigerant flow path groove 112a. This is to allow the refrigerant and the oil to be affected by the centrifugal force of the rotary wing after being discharged smoothly to the centrifugation space.

The rotary wing 210 may have a constant height. In one example, the height of the rotary wing may be different along a circumferential direction. For example, the rotary wing 210 may be formed in a wave shape or a step shape along the circumferential direction. The rotary wing 210 may be formed in a form of a single circumferential wall. In this case, the rotating member 200 has a cup shape.

In order to form the rotating member 200 in a simple form and easily fix the rotating member 200, the rotating member 200 may include a flange portion 220. The flange portion 220 may be fixed to the rotor 124 or to the rotation shaft 126. The flange portion 220 may be fixed through a stud, bolt, or screw coupling.

The rotary wing may protrude to have a height from the flange portion. That is, the rotary wing may protrude upward from a circumference of the flange portion, so that the rotating member 200 may have a cup shape. The flange portion 220 is preferably in a form of a flat plate. Therefore, the rotating member 200 may be referred to as a rotating cup.

The rotating member 200 may be easily produced by forming the flange 220 and the rotary wing 210 integrally.

Meanwhile, the coil 112a illustrated in FIG. 1 has an end coil 122b that protrudes further from the upper face of the stator 112. Therefore, it is preferable that the centrifugal force through the rotating member 200 spreads, beyond the end coil 122b, to near or above the refrigerant discharge pipe 116. To this end, the height of the rotary wing 210 is preferably greater than or equal to a height of a distal end of the coil wound around the stator, that is, an upper end coil 122b. Thus, the flow generated by the rotating member 200 may proceed further radially outward beyond one end of the upper end coil 122b.

It is preferable that the distal end 116a of the discharge pipe 116 further extends into the inner space V12 of the rotating member 200. This is because the rotating member 200 divides the centrifugation space V1 into the inner space V12 and the outer space V11 of the rotating member, and oil with a high density is gathered to a radially outer side and oil with a low density is gathered to a radially inner side. Further, since the discharge pipe 116 communicates a relatively high pressure compressor internal space with a relatively low pressure compressor external space. Therefore, it is desirable that the position of the distal end 116a of the discharge pipe 116 extends further downward from a center of the centrifugation space. This may effectively prevent the oil with high density from overcoming the centrifugal force, and flowing into the discharge pipe. That is, the oil may be significantly prevented from flowing through the refrigerant inlet hole 116b of the discharge pipe 116.

When a height of the centrifugation space is H, H is a sum of h2, the height of the rotary wing, and h1, a distance between a top of the rotary wing and the first shell. In addition, an inner diameter of the discharge pipe may be referred to as d1, an outer diameter of the discharge pipe may be referred to as d2, and a diameter of the centrifugation space may be referred to as D1.

Since a size of the discharge pipe will depend on an amount of the refrigerant discharged or a capacity or size of the compressor, d1 and d2 will be fixed values, and H and D1 will also be fixed values. In one example, these values may be changed but the changes in these values are undesirable because changes in overall structure and size of a predesigned compressor are needed.

Therefore, it is desirable to properly determine a diameter D2 of the rotating member 200, a height h2 of the rotating member 200, and a separation distance T between the rotating member 200 and the discharge pipe distal end 116a, except for other values.

As described above, since the discharge pipe distal end 116a is preferably located in the inner space of the rotating member 200, T must be less than h2. As h2 increases, a volume of the inner space V12 of the rotating member 200 increases. However, in this case, there may be a problem that the refrigerant located in the outer space V11 of the rotating member 200 may not be discharged smoothly. This is because, as h2 increases, h1 decreases, and an area for the refrigerant to flow into the inner space V12 from the outer space V11 of the rotating member decreases.

Therefore, it is preferable that h1 is equal to d2, which is the outer diameter of the discharge pipe, or increased or decreased substantially within 10% of the d2 value. Further, it is preferable that h2 is larger than h1. Thus, the centrifugal force by the rotating member may further spread to the centrifugation space, and the refrigerant may be smoothly flowed into the inner space from the outer space of the rotating member.

Further, the smaller the T, the smaller the area where the refrigerant flows through the refrigerant inlet hole 116b of the discharge pipe. Therefore, a flow resistance becomes large. Therefore, T may be determined to be larger than 0.25 times d2. As T further increases, the refrigerant inlet hole 116b of the discharge pipe further becomes closer to the outer space of the rotating member. Therefore, a possibility of the oil flowing into the discharge pipe increases. In consideration of this, T may be determined to be equal to or less than d1.

Further, the rotating member means an additional load of the driving motor. Therefore, a thickness of the rotating member 200 is preferably small. However, the thickness of the rotating member 200, in particular, of the rotary wing 210, is preferable to be a thickness having a rigidity that is enough not to be susceptible to deformation.

Figure 2:
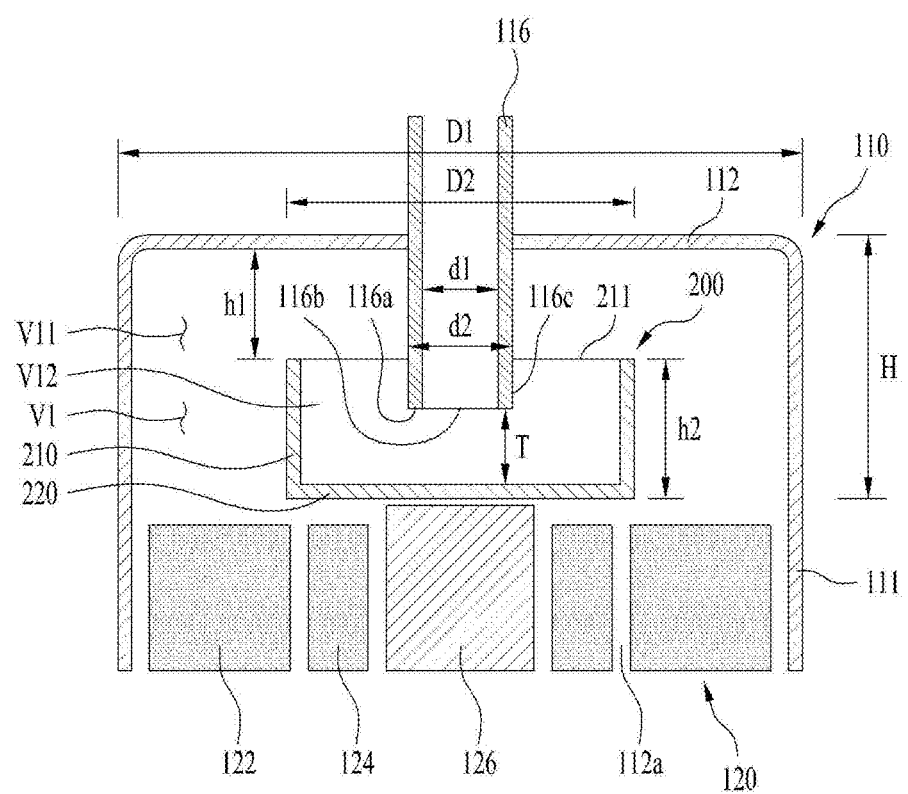
FIG. 2 is a simplified cross-sectional view of a compressor according to an embodiment of the present disclosure.
Figure 3:
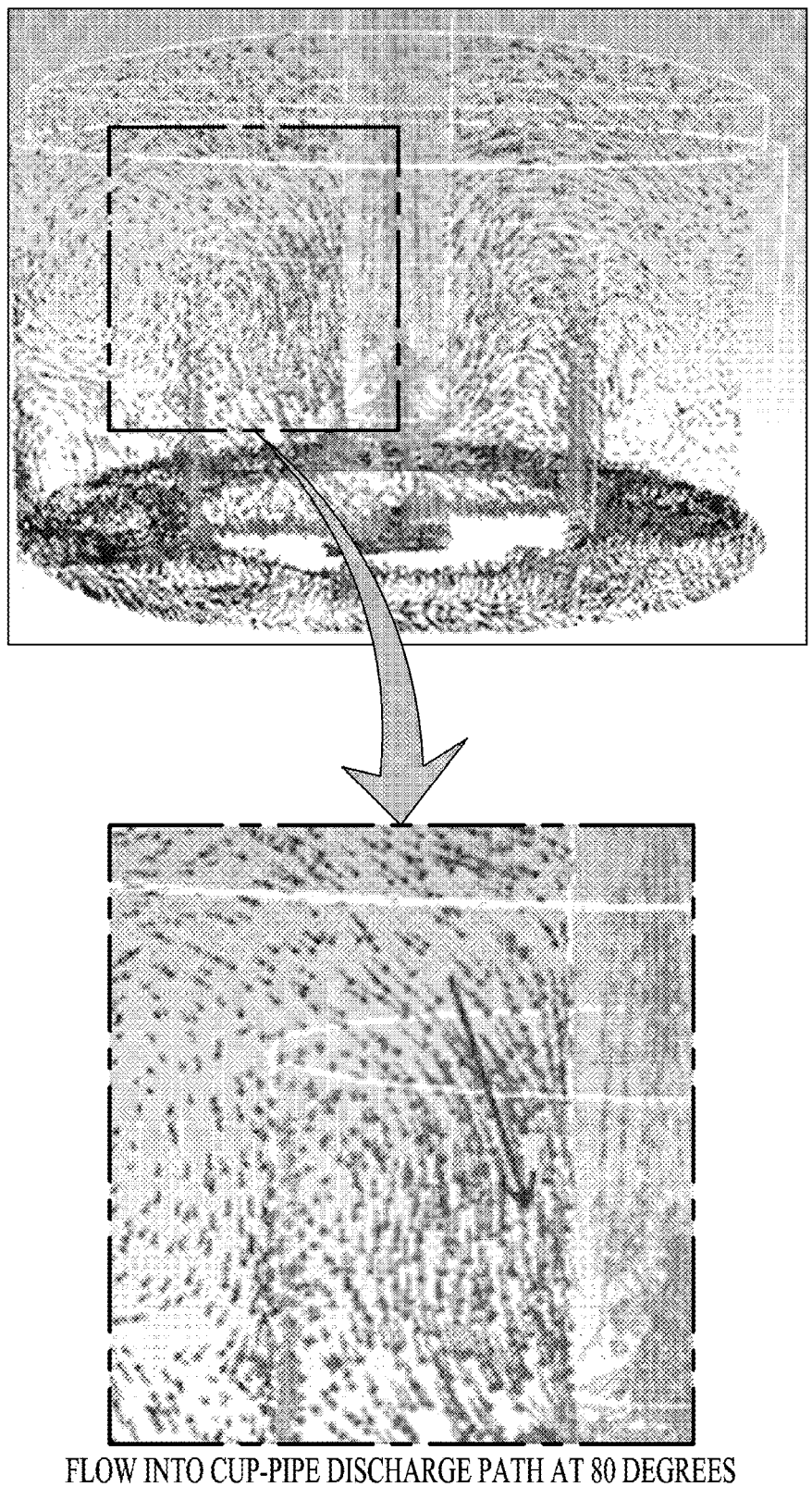
FIG. 3 shows flow of oil and refrigerant in a centrifugation space inside a compressor shown in FIG. 2.

FIG. 3 shows flow of the refrigerant and the oil when the rotating member shown in FIG. 2 is applied.

As shown, it may be seen that light colored refrigerant is discharged through the discharge pipe and dark colored oil flows in the centrifugation space and gathers to an inner face or a bottom of the centrifugation space.

However, as seen in such flow analysis, the oil towards the discharge pipe may be seen near an outer wall 116c of the distal end 116a of the discharge pipe 116. The oil may flow near the distal end of the discharge pipe at an angle of approximately 80 degrees (about 10 degrees relative to the outer wall of the discharge pipe). There is a possibility that a small amount of oil is discharged to the discharge pipe by such oil flow.

Figure 4:
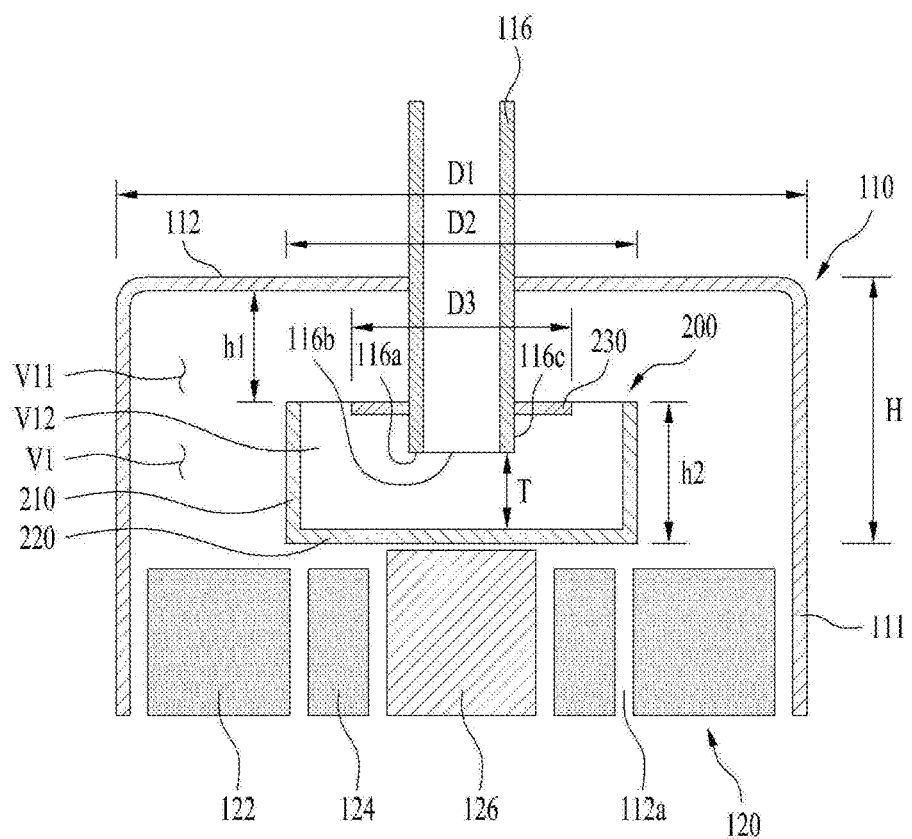
FIG. 4 is a simplified cross-sectional view of a compressor according to another embodiment of the present disclosure.

In order to solve such problem of oil discharge possibility, as shown in FIG. 4, a guide 230 may be further provided in an embodiment of the present disclosure.

The lubricant oil may be prevented from flowing downward through the outer wall 116c of the discharge pipe 116 and flowing into the refrigerant inlet hole 116b through the guide 230.

The guide 230 may be provided to surround the discharge pipe 116 near the distal end 116a of the discharge pipe. The guide 230 may be formed in a skirt shape extending radially from the outer wall of the discharge pipe.

The guide 230 may have a plate shape having a center portion thereof through which the discharge pipe 116 penetrates, and may have a circular plate shape.

A maximum outer diameter D3 of the guide is preferably smaller than a minimum inner diameter of the rotary wing. Thus, an annular space is defined between a radially inner side of the minimum inner diameter of the rotary wing and a radially outer side of the maximum outer diameter of the guide. That is, the refrigerant and the oil may enter the internal space V12 of the rotating member through the annular space. However, as described above, since the oil having high density is gathered to the radially outer side, substantially only the refrigerant may be flowed into the internal space V12 through the annular space. In addition, the flow of the oil toward the outer wall of the discharge pipe 116 is blocked by the guide 230, so that the oil flows to the radially outer side. Such flow of the oil toward the radially outer side is scattered upward after being influenced by the rotatory power of the rotating member 200 and is gathered to the radially outer side.

A position of an upper face of the guide 230 may be the same as a position of the upper end of the rotary wing 210. In one example, the position of the upper face of the guide 230 may be higher or lower than the position of the upper end of the rotary wing 210. However, as shown in FIG. 3, since the flow of the oil toward the discharge pipe 116 occurs from above the upper end of the rotating member, the position of the upper face of the guide 230 is desirable to be the same as or higher than the position of the upper end of the rotary wing 210.

Further, the guide 230 may be formed to have an umbrella shape. That is, the guide 230 may be formed to be inclined downward outwardly from a radial center. In this case, the center of the guide 230 may be located closer to the inner face of the case (e.g., upper side) than the discharge pipe. However, a position of a radial distal end of the guide 230 may be located at the same as a position of the radial distal end thereof shown in FIG. 4 or slightly close to the first shell, and a maximum radius may be preferably be the same.

A difference between an area defined by the inner diameter of the rotating member and an area defined by the outer diameter of the guide may be an area into which the refrigerant flows into the rotating member. Therefore, a size of the area into which the refrigerant flows is preferably larger than an area of the refrigerant inlet hole of the discharge pipe.

Figure 5:
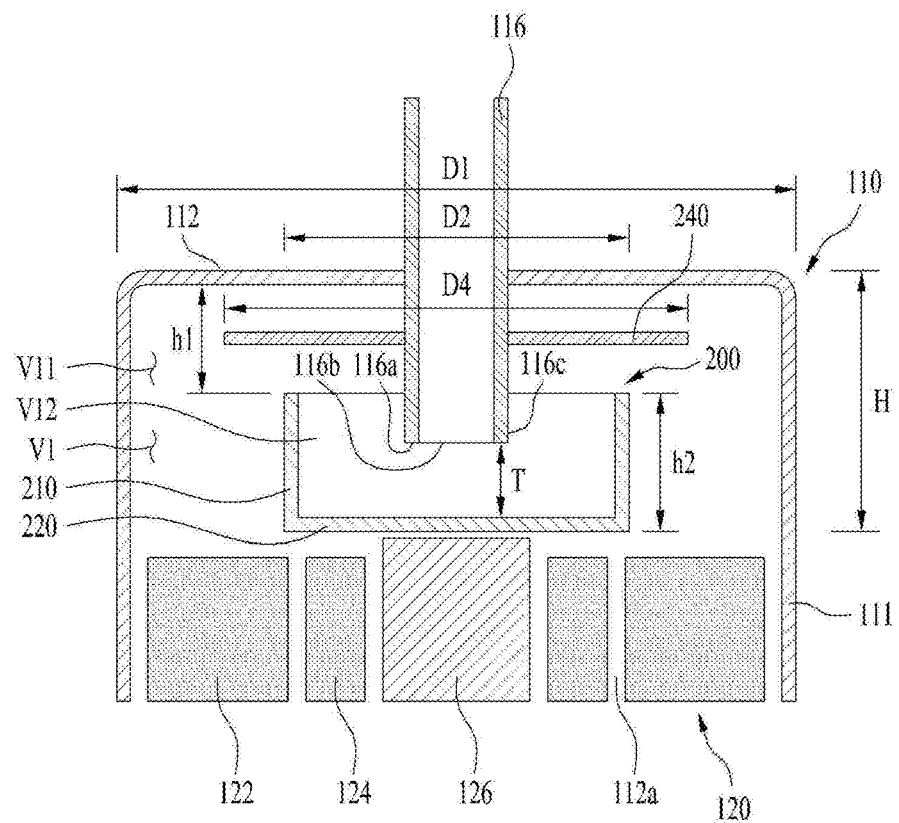
FIG. 5 is a simplified cross-sectional view of a compressor according to another embodiment of the present disclosure.

FIG. 5 shows another embodiment of the guide. A guide 240 in the present embodiment is located above the guide in the above-mentioned embodiment, and has a maximum radius larger than that of the guide in the above-mentioned embodiment. That is, the guide having an outer diameter larger than the maximum outer diameter of the rotating member 200 may be provided.

In this case, the flow of the oil toward the outer wall of the discharge pipe 116 is blocked in advance, so that the oil is effectively blocked from flowing into the internal space of the rotating member. Thus, it may be expected that an oil content rate is reduced more than in the embodiment shown in FIG. 3.

Figure 6:
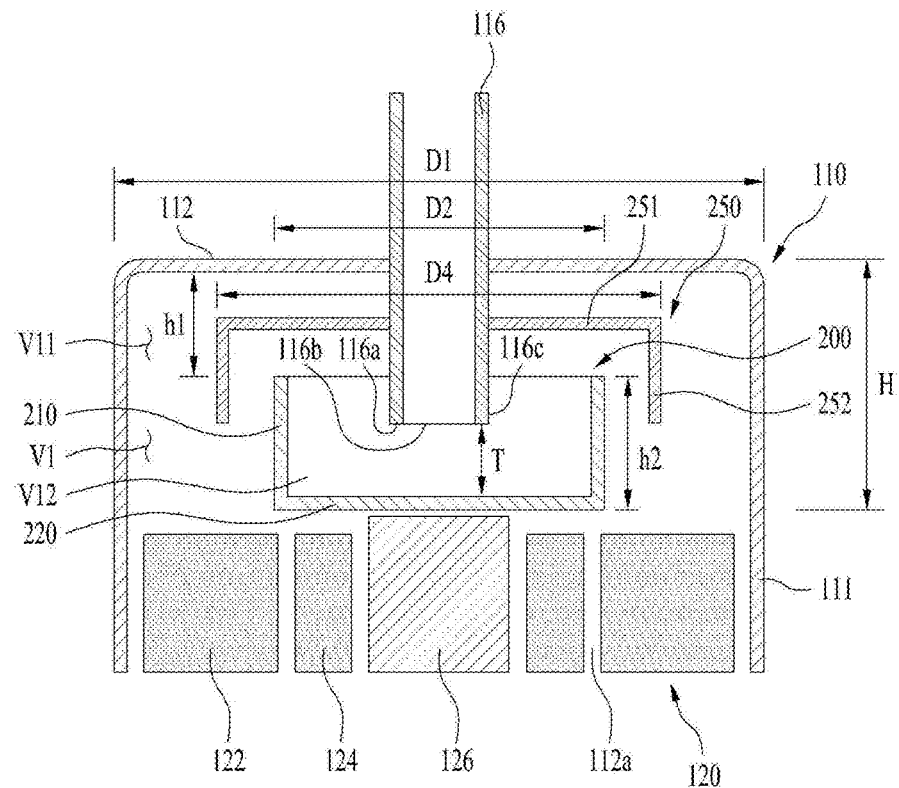
FIG. 6 is a simplified cross-sectional view of a compressor according to another embodiment of the present disclosure.

FIG. 6 shows another embodiment of the guide. A guide 250 in the present embodiment may include a first extended portion 251 and a second extended portion 252. The first extended portion may be the same as the guide 240 described above, and each second extended portion 252 may extend downward from a radial distal end of the first extension part 251.

The flow of the oil toward the outer wall of the discharge pipe 116 is blocked in advance by the second extended portion 252, thereby effectively preventing the oil from flowing into the rotating member internal space. In addition, the oil scattering in the radial direction from the first extended portion 251 is blocked by the second extended portion 252, so that the oil is not easy to flow into the rotating member internal space. Thus, it may be expected that the oil content rate is reduced more than in the embodiment shown in FIG. 3.

Figures 7, 8:
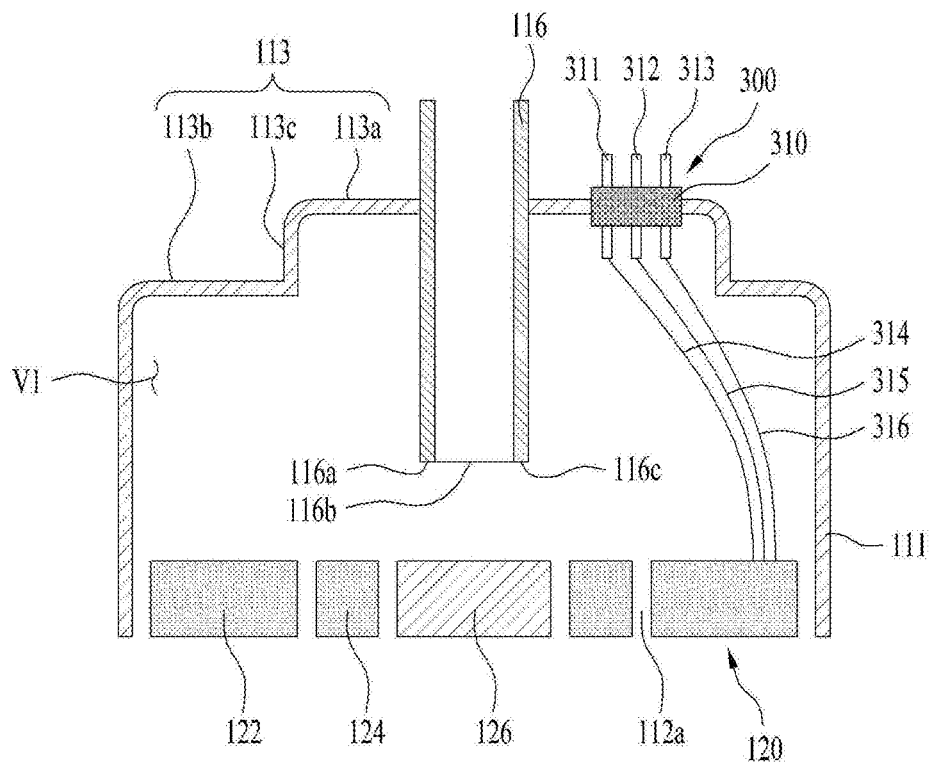
FIG. 7 is a table comparing OCR performances in the embodiments respectively shown in FIGS. 2, 4, 5, and 6.
FIG. 8 is a simplified cross-sectional view of a conventional compressor.

FIG. 7 shows a table comparing effects of oil content rates with each other. FIG. 7 shows oil content rates (Oil Content Rates, OCRs) of a basic concept shown in FIG. 2, of a case 1 shown in FIG. 4, of a case 2 shown in FIG. 5, and of a case 3 shown in FIG. 6. The oil content rate may be expressed as a ratio of a weight percent of the oil to a total weight percentage of the refrigerant and the oil discharged from the discharge pipe 116.

As shown in FIG. 7, it may be seen that simply applying the rotating member 200 as in the case 1 results in a 0.02 OCR result under the same driving condition (e.g., 120 Hz) of the compressor. This is a result indicating very effective oil separation, and is able to be said as a result of oil separation at a level that practically does not require an oil separator or oil recovery apparatus.

It may be seen that applying the rotating member 200 and the guide 230 as in the case 2 results in a 0.01 OCR result under an extreme driving condition (e.g., 161 Hz) of the compressor. This may be said as a result indicating very outstanding oil separation. In other words, it may be said as the result of the oil separation at the level that practically does not require the oil separator or oil recovery apparatus.

The cases 3 and 4 also show better oil separation results than the basic concept. That is, it may be seen that, in any case, the oil separation result is improved by including the rotating member 200 and the guides 230, 240, and 250.

However, as seen in the case 3 and the case 4, through the guides 240 and 250, it may be seen that it is not an optimal solution to bend the flow path from the outside to the inside of the rotating member 200 or to narrow the area of the flow path.

This may be attributed to a fact that, when a difference between an internal pressure and an external pressure of the compressor exists, a suction pressure to the discharge pipe 116 is constant, but when a flow resistance occurs in a path to the discharge pipe 116, a portion of the oil flows together with the refrigerant.

Therefore, it may be said that the smaller the area of the flow path of the refrigerant into the internal space of the rotating member 200, that is, the number of bends of the flow path defined between the rotary wing 210 and the guides 230, 240, and 250 of the rotating member 210, the better.

It may be said that the refrigerant flows into the internal space of the rotating member 200 by 0 to 1 time of bending in the basic concept and the case 1, by 1 to 2 times of bending in the case 2, and 2 to 3 times of bending in case 3.

As the area of the flow path becomes smaller, the discharge of the refrigerant is not smoothly generated, which may cause an increase in the oil content rate, on the contrary. Therefore, a cross-sectional area of the flow path between the rotating member and the guide may be larger than an area by the inner diameter of the discharge pipe.

Hereinabove, the embodiments having the effect of reducing the oil content rate through the rotating member 200 in the centrifuge space have been described. That is, the embodiments that may reduce the oil content rate by increasing the centrifugal force by adding the rotating member 200 in the centrifuge space have been described.

The present inventors have found that the oil content rate may be reduced by removing obstruction factors of the centrifugal force as well as by increasing the centrifugal force or expanding the area where the centrifugal force is applied. In other words, it may be seen that the oil content rate may be reduced by considering and effectively eliminating obstruction factors of the centrifugal force in the centrifugal space inside the compressor.

In the following, embodiments which effectively reduce the centrifugal force obstruction factors will be described in detail. The same components will be described with the same reference numerals, and redundant description thereof may be omitted.

FIG. 8 shows a first shell (e.g., a top cross-section) of a conventional rotary compressor. In the related art, a step 113c is formed on a first shell 113 for convenience or practice of production, and a terminal 300 for power connection is formed at a top of the first shell 113. That is, the terminal is disposed on a central upper face 113a of the first shell 113. The terminal 300 includes a main body 310 and taps 311, 312, and 313. Each tap that is single phase may be a plus tap, a minus tap, and a ground tap. In a 3-phase case, each tap may be a 1-phase tap, a 2-phase tap, and a 3-phase tap.

The taps are connected to lead wires 314, 315, and 316 inside the compressor, respectively. That is, the lead wires respectively extend downward from the taps to be connected to the coil 122a of the stator.

As described above, it has been described that, in the lower compression or upstream compression type compressor, an upper space or a downstream space inside the compressor may be used as the centrifugation space to reduce the oil content rate.

The present inventor noted an influence of a shape of the first shell 113 and a position of the terminal 300 as centrifugation obstruction factors in the centrifugation space. The first shell may also be referred to as a top cap.

Due to the centrifugal force, the oil having the high density should flow smoothly in the radially outward direction. Further, such smooth flow must be carried out throughout the centrifugation space. In addition, the refrigerant present at the radially outer side should flow smoothly in the radially inward direction.

However, it may be seen that a flow resistance may be generated by the shape of the first shell 113 and the tap terminal at a first shell side or in an upper portion of the centrifugation space to obstruct the centrifugation. In addition, it may be seen that the obstruction of the centrifugation may occur in the lead wires 314, 315, and 316 extending downward and radially outward from the tap terminal 300.

Such shape of the first shell 113 and position of the tap terminal 300 were not a problem in the conventional upper or downstream compression type compressor. This is because, since no centrifugation space was defined, no oil separation using the centrifugation space was applied.

In addition, since installation of the discharge pipe and the terminal is easy by forming the first shell 113 to have the center face 113a, the step 113c, and a peripheral face 113b, there was no need to change the shape of the first shell and the position of the terminal.

On the other hand, in the case of the rotary or scroll compressor in which the upper or downstream space may be applied as the centrifugation space as in the embodiment of the present disclosure, more efficient oil separation may be achieved by removing such centrifugation obstruction factors.

First, an embodiment in which the position of the tap terminal is changed will be described with reference to FIG. 9.

In the present embodiment, the conventional step type first shell is applied intactly, but the position of the terminal 300 is changed to a side of the compressor rather than a periphery (e.g., top) of the discharge pipe 116. For example, the terminal 300 may be formed on one side of a cylindrical shell 111.

In this case, a height difference between the terminal 300 and the stator 122 may be significantly reduced. In addition, the lead wires 314, 315, and 316 may extend radially outward from the stator 122, not radially inward therefrom. That is, a length of the lead wire in the centrifugation space may be reduced, and the lead wire may be located at a vertical center or below the vertical center of the centrifugation space.

In this connection, positional relationships of the taps 311, 312, and 313 of the terminal 300 are important. That is, the heights of the taps may be the same or different. That is, the main body 310 of the tap terminal may be positioned horizontally or vertically.

Since a constant gap must be defined between adjacent taps, a constant gap is defined between adjacent lead wires as well. Therefore, on the premise that the flow is generated in the radial direction, when the tap terminal main body 310 is positioned horizontally, a flow resistance area is generated very largely. That is, the flow resistance areas may be defined in all three lead wires. On the other hand, when the tap terminal main body 310 is positioned vertically, the flow resistance area is significantly reduced. That is, since the three lead wires overlap in the radial direction, it may be said that the flow resistance area is defined in one lead wire.

Figure 9:
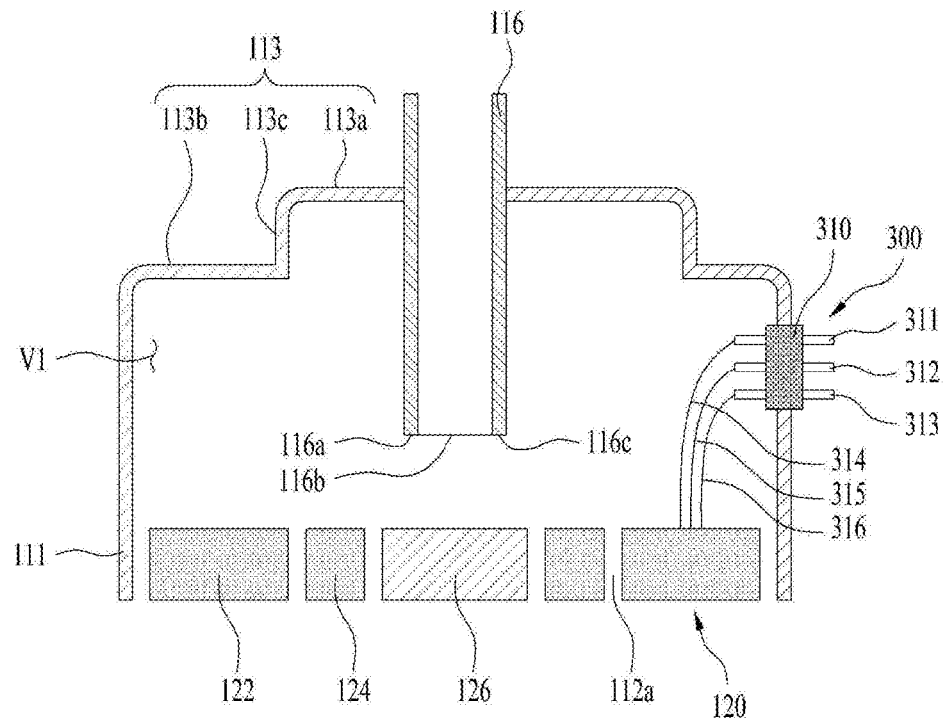
FIG. 9 is a simplified cross-sectional view of a compressor according to an embodiment of the present disclosure.

Therefore, the flow by the centrifugation may be effectively generated by the position of the terminal 300, the installation form of the terminal body 310, and the extension direction of the lead wire shown in FIG. 9. That is, a centrifugation disturbance area may be significantly reduced. Therefore, the oil separation effect by the centrifugation may be expected to be enhanced.

Figure 10:
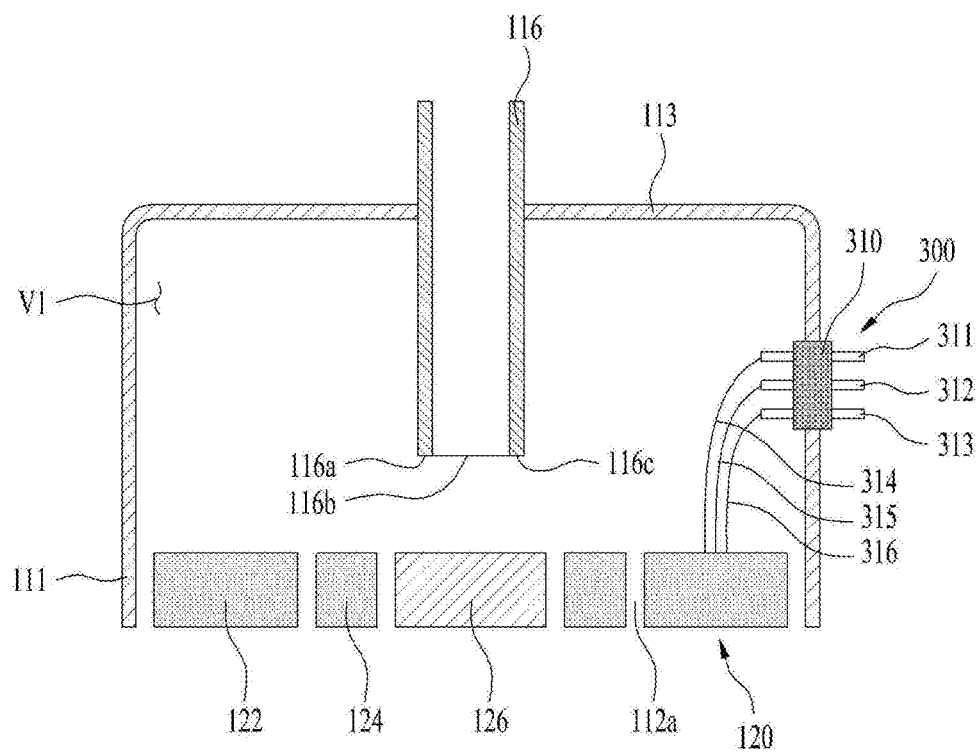
FIG. 10 is a simplified cross-sectional view of a compressor according to another embodiment of the present disclosure.

An embodiment shown in FIG. 10 is different from the embodiment shown in FIG. 9 in that the shape of the first shell 113 is flattened. In other words, the first shell is formed in the flat form rather than in the step form.

Therefore, the obstruction of the centrifugation due to the shape of the first shell may be significantly reduced, so that the oil separation effect may be expected to be enhanced. In particular, the centrifugation space may be increased, and a significant oil separation effect may be expected because of a reduction of the flow resistance due to a continuous plane.

Figures 11, 12:
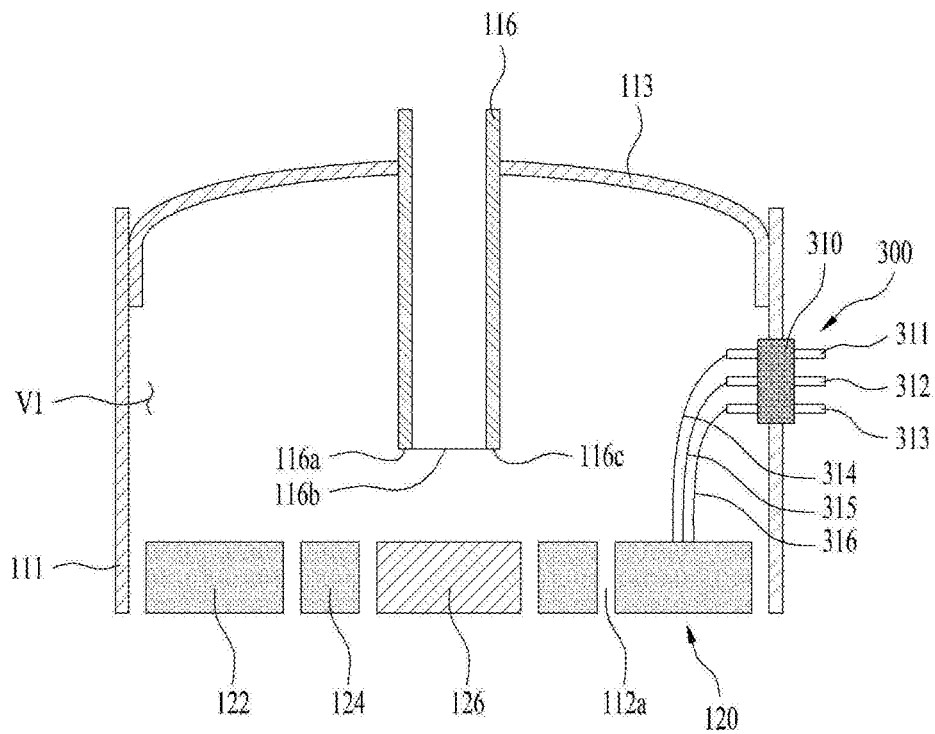
FIG. 11 is a simplified cross-sectional view of a compressor according to another embodiment of the present disclosure.
FIG. 12 is a table comparing OCR performances in the embodiments respectively shown in FIGS. 8 to 11.

An embodiment shown in FIG. 11 is different from the embodiment shown in FIG. 9 in that the shape of the first shell 113 is curved. That is, the embodiment shown in FIG. 11 is different from the embodiment shown in FIG. 9 in that the top or downstream of the first shell 113 is convex. The inner face of the compressor of the first shell 113 forms a curved face, which may be inclined downward radially.

Thus, smooth flow may occur at a radially outer side along the inner face of the first shell 113. That is, the flow resistance may be significantly reduced.

Further, in order to further reduce the flow resistance along the inner face of the first shell 113, the inner face of the first shell 113 may have multiple divided arcs having varying curvature. That is, a radius of curvature may decrease in a radially outward direction.

FIG. 12 is a table comparing OCR values of the compressor, in particular, the rotary compressor shown in FIG. 8, the compressor, in particular, the rotary compressor shown in FIG. 9, the compressor, in particular, the scroll compressor shown in FIG. 10, and the compressor, in particular, the scroll compressor shown in FIG. 11 with each other. FIG. 12 is a table comparing OCR values under the same operating condition with each other.

The OCR value in the lower compression type rotary compressor shown in FIG. 8 is relatively very large. In particular, it may be said that the separate oil separator or the like is required due to the shape of the first shell having the multi-step face and the position of the terminal.

It may be seen that the OCR value in the lower compression type rotary compressor shown in FIG. 9 is reduced to 0.13 due to the position of the terminal. However, it may still be said to be higher than a required 0.1 weight percent.

It may be seen that the OCR values in the lower compression type scroll compressors respectively shown in FIGS. 10 and 11 have a 0.02 weight percent, which is significantly lower than the required 0.1 weight percent due to the position of the terminal and the shape of the first shell.

This shows that an OCR performance of the lower compression type scroll compressor is significantly better than that of the lower compression type rotary compressor. In addition, it may be seen that very excellent OCR performance may be achieved by changing the shape of the first shell and the terminal.

Further, the shape of the first shell may be variously changed. Therefore, it is necessary to examine a generalization of the first shell shape and a change of the OCR resulted therefrom.

The first shell 113 shown in FIG. 9 has two continuous faces with different vertical levels and a step face between the two continuous faces. The two continuous faces may be flat or curved. In this connection, a center of the radius of curvature may be inside the compressor. In another example, a center of the radius of curvature of the step face may be outside the compressor. Therefore, the radius of curvature varies along the radial direction.

The first shell 113 shown in FIG. 10 may be formed in substantially one plane. Thus, a radius of curvature is substantially infinite.

The first shell 113 shown in FIG. 11 may have one curved face. However, a radius of curvature may vary along the radial direction.

Figure 13:
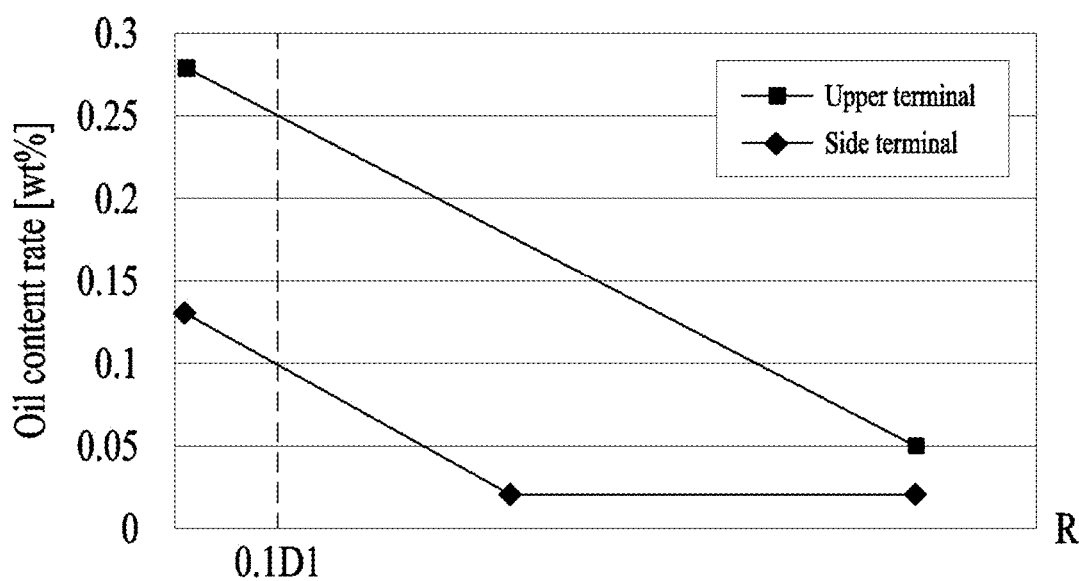
FIG. 13 is a table showing OCR changes based on an average radius of curvature factor of a first shell and a position of a terminal.

FIG. 13 shows a relationship between the curvature of the first shell 113 and the oil content rate.

It may be seen that, when the terminal 300 is disposed on the first shell 113 as in the related art and heights of the plurality of taps are the same, the oil content rate decreases as an average radius of curvature factor of the first shell increases. The average radius of curvature factor may be said as a value obtained by dividing the first shell into a plurality of sections along the radial direction, adding up products between radii of curvature and lengths of arcs of the divided sections, and then dividing the sum by a diameter of the centrifugation space. The radius of curvature may vary, and the first shell 113 may be formed in the multiple-step shape in some cases. Therefore, it may be said that the average radius of curvature factor is defined for such cases.

In this connection, it may be seen that as the average radius of curvature factor increases, the oil content rate decreases, but only up to 0.05 OCR.

On the premise that the required OCR is 0.1, it is difficult to satisfy a requirement of the reduction of the oil content rate by only disposing the terminal on the first shell and changing the shape of the upper shell.

On the other hand, it may be seen that the required OCR may be easily satisfied by disposing the terminal 300 on the side of the cylindrical shell 111. It may be seen that, when the average radius of curvature factor is equal to or larger than $1/10$ of the diameter of the centrifugation space, the 0.1 weight percent, which is the required OCR, may be satisfied.

It may be seen that up to approximately 0.02 weight percent may be satisfied by gradually increasing the average radius of curvature factor.

Therefore, the OCR performance may be very effectively improved by forming the first shell of a form that is easy to produce and disposing the terminal on the cylindrical shell. In particular, an OCR value lower than the required 0.1 weight percent may be obtained. The lower the OCR value, the better. Therefore, this may be implemented by the compressor itself without a large configuration change of the compressor and without requiring the separate oil separator or the like.

Hereinabove, the embodiment (first form) in which the OCR is reduced by the rotating member and the guide, and the embodiment (second form) in which the OCR is reduced based on the shape of the first shell and the position of the terminal have been described.

In this connection, the forms do not contradict each other. That is, one of the forms may be implemented in combination with the other. That is, it may be easily predicted that the OCR may be further reduced.

For example, the case 1, which is the optimal embodiment shown in FIG. 7, and the embodiment having the first shell in the flat shape and the terminal disposed on the side of the first shell, which is the optimal shown in FIG. 10, may be implemented in a complex manner. In this case, the OCR further lower than 0.01 may be expected. In particular, the OCR reduction effect may be very remarkable in the scroll compressor other than the rotary compressor.

It is very encouraging that the OCR may be significantly reduced in the compressor itself at a low additional cost. In particular, implementing the OCR less than 0.01 weight percent, which is significantly lower than the required 0.1 weight percent, is a surprising achievement. This means that many problems such as a cost of the separate oil separator or the like, an installation cost, a maintenance cost, a deterioration of a heat exchange efficiency, a damage to the compressor due to wear of the bearing portion, and the like may be easily solved.

What is claimed is:

1. A compressor comprising:
   a case;
   a driving motor disposed inside the case, the driving motor comprising a stator mounted to an inside of the case and a rotor disposed radially inward of the stator and configured to rotate relative to the stator;
   a discharge pipe that passes through one side of the case;
   a rotation shaft coupled to the rotor and configured to rotate the rotor relative to the stator;
   a rotating member disposed at a first side of the driving motor in a centrifugation space that is defined between the first side of the driving motor and the one side of the case, the centrifugation space being configured to receive refrigerant and lubricant oil, wherein the rotating member is configured to rotate together with the rotor to thereby provide a centrifugal force to the refrigerant and the lubricant oil;
   a compressing portion disposed at a second side of the driving motor and configured to compress refrigerant based on rotation of the rotation shaft; and
   a guide that surrounds the discharge pipe and that is disposed at a position adjacent to a refrigerant inlet hole defined at a distal end of the discharge pipe, the guide being configured to block the lubricant oil from entering to the refrigerant inlet hole from an outside of the discharge pipe,
   wherein a maximum outer diameter of the guide is less than a minimum inner diameter of the rotating member.

2. The compressor of claim 1, wherein the rotating member comprises a rotary wing disposed in the centrifugation space and spaced apart from a center of the rotor by a predetermined distance.

3. The compressor of claim 2, wherein a maximum outer diameter of the rotary wing is less than or equal to an outer diameter of the rotor.

4. The compressor of claim 2, wherein the rotary wing is a single rotary wing that has a circular cross-section or a polygonal cross-section.

5. The compressor of claim 2, wherein the rotary wing surrounds an outer circumference of the discharge pipe, and
   wherein a minimum inner diameter of the rotary wing is greater than an outer diameter of the discharge pipe.

6. The compressor of claim 2, wherein the rotary wing extends in a vertical direction away from the rotor to thereby define an internal space of the rotating member inside the centrifugation space.

7. The compressor of claim 6, wherein the rotary wing extends in a circumferential direction and is symmetric with respect to a rotational axis of the rotor.

8. The compressor of claim 6, wherein the rotary wing extends in a circumferential direction and is symmetric with respect to a rotational axis of the rotor, and wherein a height of the rotary wing is constant along the circumferential direction.

9. The compressor of claim 6, wherein a distal end of the discharge pipe defines a refrigerant inlet hole that extends into the internal space of the rotating member.

10. The compressor of claim 9, wherein a linear distance between the refrigerant inlet hole of the discharge pipe and a bottom of the internal space of the rotating member is greater than $1/10$ of a linear distance between a top of the rotary wing and an inner top surface of the case.

11. The compressor of claim 6, wherein the driving motor further comprises a coil that is wound around the stator and that protrudes upward relative to an upper surface of the stator, and
wherein an upper end of the rotary wing is positioned at or vertically above an upper end of the coil.

12. The compressor of claim 2, wherein the rotating member comprises a flange portion coupled to the rotor, and
wherein the rotary wing extends from the flange portion in a vertical direction away from the rotor.

13. The compressor of claim 12, wherein the flange portion and the rotary wing are portions of one integral part.

14. The compressor of claim 1, wherein the guide has a skirt shape that extends radially outward from an outer surface of the discharge pipe.

15. The compressor of claim 14, wherein a top of the guide is disposed at a position corresponding to a top of the rotating member, or is spaced apart from the top of the rotating member in a direction toward the discharge pipe.

16. The compressor of claim 1, wherein the guide has a circular plate shape, and the discharge pipe passes through a center portion of the guide.

17. The compressor of claim 1, wherein the rotating member comprises a rotary wing that is disposed in the centrifugation space, that is spaced apart from a center of the rotor, and that extends in a vertical direction away from the rotor to thereby define an internal space of the rotating member inside the centrifugation space,
wherein the guide is disposed in the internal space of the rotating member, and
wherein the discharge pipe defines a refrigerant inlet hole at a distal end of the discharge pipe that extends into the internal space of the rotating member.

18. The compressor of claim 17, wherein a linear distance between the refrigerant inlet hole of the discharge pipe and a bottom of the internal space of the rotating member is greater than $1/10$ of a linear distance between a top of the rotary wing and an inner top surface of the case.

19. The compressor of claim 1, further comprising:
a terminal that is disposed on the case, that faces the centrifugation space, and that is connected to a coil of the stator.

* * * * *